United States Patent Office 2,943,676
Patented July 5, 1960

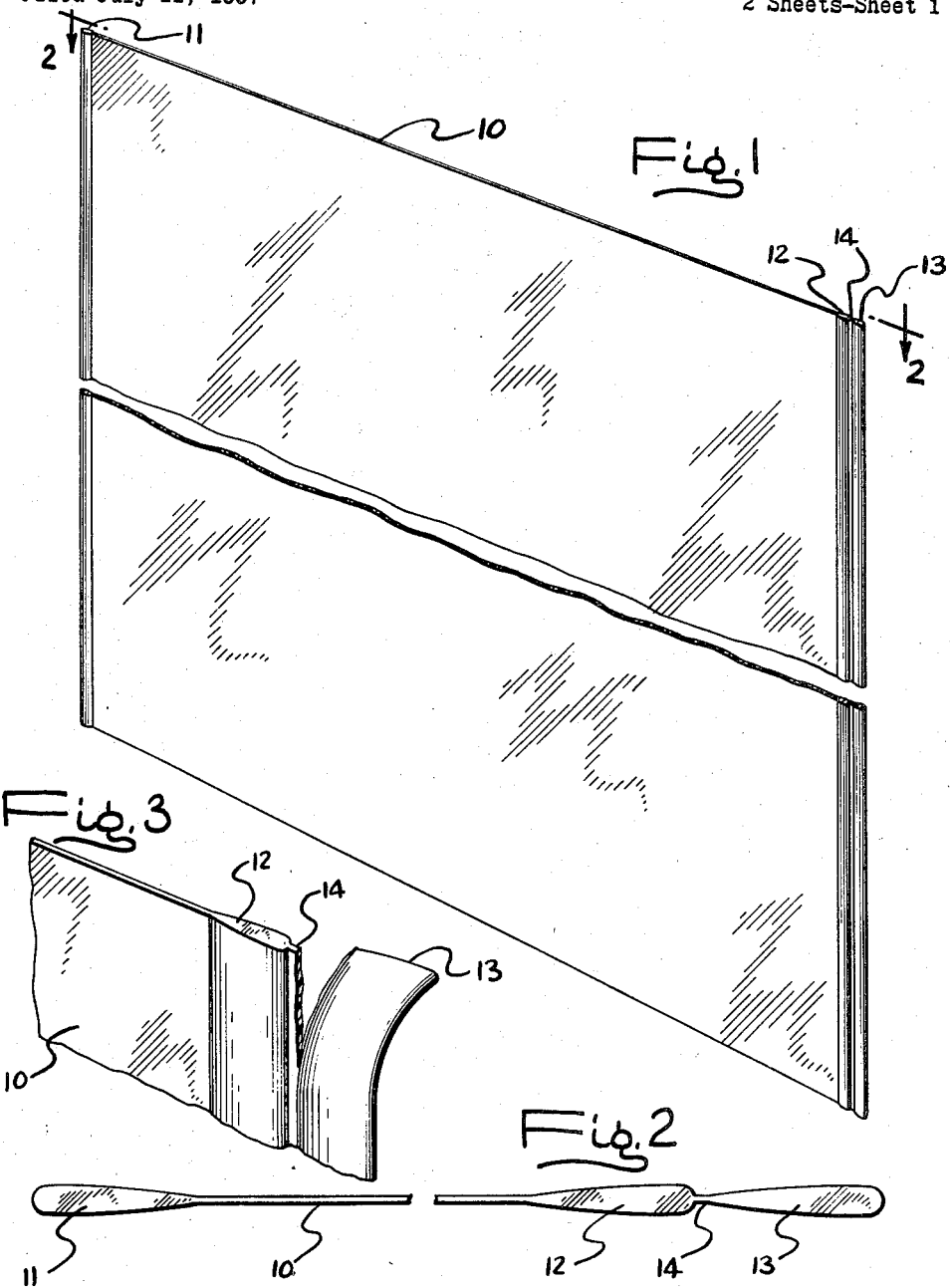

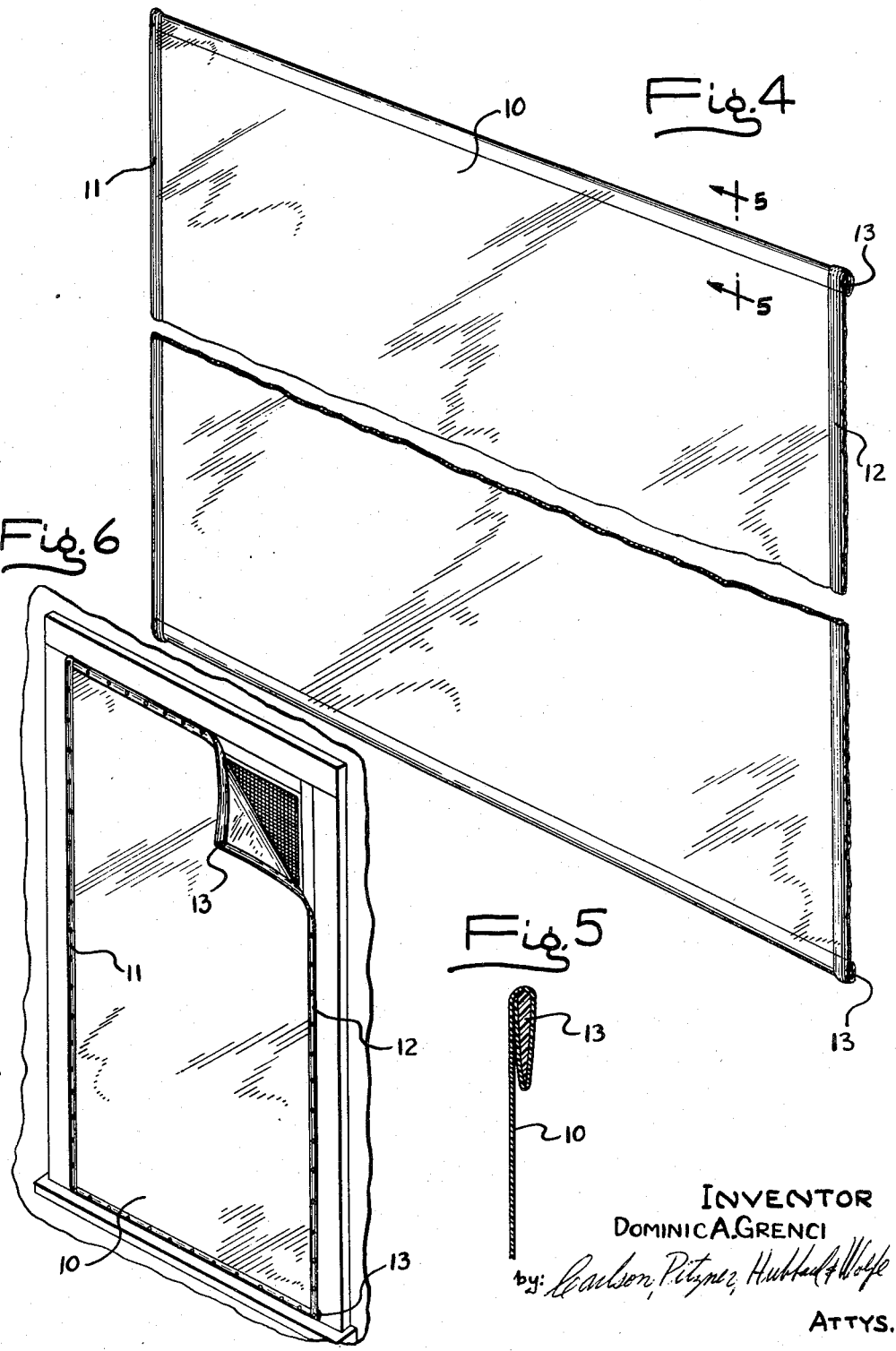

2,943,676

PLASTIC WINDOW COVERING AND METHOD OF MAKING THE SAME

Dominic A. Grenci, Canadaigua, N.Y., assignor, by mesne assignments, to National Distillers and Chemical Corporation, a corporation of Virginia Filed July 11, 1957, Ser. No. 671,241

4 Claims. (Cl. 160—368)

This invention relates to a novel window covering. More specifically, it is concerned with a very narrow gauge film of polyethylene or other extrudable thermoplastic which results in a pliable substantially transparent film suitable for simple attachment to the window frames of homes and other structures.

There are two principal applications for the present invention. The first of these is in the field of inexpensive "storm windows." The second is in the construction industry wherein it is desired, prior to the time actual glass closures are put in place, to protect the workmen and the inerior of the structure from the weather.

It has, of course, been well known for the last few years that polyethylene film as well as certain other films of thermoplastic organic polymers could be used for these general purposes. The usual technique for affixing the pliable plastic film to a building opening, usually a window but they are equally useful in sealing doorways and the like, is to nail the edges to the casement either directly or by means of a molding strip of wood or other material.

In the use of these materials for homes, i.e., existing dwellings on which no construction is taking place, it is, of course desired that a very neat and easily affixed storm window be available to the public. In the first place, the usual home owner is not familiar with the properties of these thin plastic films and are often not, as a general rule, able to properly handle the same without tearing them unless certain factory-embodied features are built into the plastic storm window.

As is well known to those who have attempted to stretch films or sheets of narrow gauge polyethylene or similar material across a window and fasten it by nails, the chance of tearing the sheet is high.

It is therefore an object of this invention to provide an almost fool-proof, prefabricated polyethylene window or door covering which can be installed by even the most unskilled without danger of tearing. This object is accomplished by embodying along opposite edges of the sheet, as it is extruded, parallel welts or beads of the polyethylene. Thus, as the sheet is extruded there is continuously formed along the two opposite edges thereof, a bead or weld of about three-eighths to about three-quarters of an inch in width which is of considerably heavier gauge than the rest of the film. Such a weld or bead may be incorporated on a sheet or film of polyethylene by any suitable method and there is no intention that the present invention be limited to any particular technique for obtaining such a thickened portion. Those skilled in the art are fully acquainted with methods and apparatus for extruding sheets of polyethylene and like polymers. Likewise the extrusion of such sheets with welts or beads is known and depends primarily upon the provision for a suitable die in conjunction with otherwise conventional equipment.

Of special importance to the instant invention is the provision during extrusion of the polyethylene film (and it should be noted that although the following description will be given in terms of polyethylene, that any other suitable plastic material having the desired flexibility and transparency may likewise be employed) that the same emanates from the extruder as a continuous web which is automatically cut into the desired lengths by mechanical means. While one is able to build in, as it were, the welt or bead along the opposite edges parallel to the line of movement of the extruded film, it is substantially impractical to do so along the transverse edges of the cut sections. Obviously, when a sheet having these welts along the sides but not on the top or bottom is made available to the consumer, he will have the heavier edge on each side into which he may drive his fastening devices, be they nails, staples or the like. But at the top and bottom where the film must be likewise attached to the window casement, there is no thickened portion through which the fastening device may be inserted and the possibility of tearing or ripping is exceedingly great.

In accordance with the present invention, a storm window or more broadly a window covering, fabricated of flexible polyethylene and having available a heavy thickened portion on all four edges can be prepared. In accordance herewith, the film of polyethylene as it is extruded has incorporated along one edge a double bead or welt which can be readily divided by the user by the simple action of longitudinally tearing the outer bead from its contiguous neighbor. The section which is thus stripped from the one edge of the film is cut into two sections equal to the width of the plastic sheet and employed at the top and bottom of the plastic window by wrapping the plastic film once or twice or more around the severed bead.

The details of the invention as well as the preferred embodiment thereof may more readily be observed by reference to the attached drawings when in conjunction with the ensuing detailed description.

In the drawings:

Figure 1 is an overall perspective view of an extruded sheet of polyethylene film according to the present invention.

Fig. 2 is a view of the edge of the film shown in Fig. 1 taken along lines 2—2.

Fig. 3 is an enlarged section of the upper right hand corner of the sheet shown in Fig. 1, with severance of the outer welt from its adjoining welt begun.

Fig. 4 depicts the severed welt after it has been cut into two lengths equal to the width of the polyethylene sheet and has had one or two wraps of polyethylene at each end of the sheet.

Fig. 5 is an edge view in section of the corner of the sheet shown in Fig. 4 taken along line 5—5.

Fig. 6 shows a plastic storm window of the present invention partially affixed to a window casement.

Referring now to the drawings. Fig. 1 depicts a polyethylene sheet 10 of the present invention as it appears after being extruded by any conventional method and cut to the desired length. Sheet 10 has along its one edge a single welt or bead 11 which has been formed during the extrusion operation. Bead 11 is a continuation of sheet 10 having considerably thicker cross section than the sheet. Such a bead or welt, as mentioned above, may be prepared on a sheet of polyethylene or other suitable plastic by any suitable technique known to those skilled in the art inasmuch as the present invention does not reside in the details of an extrusion process or the die face but more broadly, in the extrusion of a double-beaded sheet as described and in the products resulting therefrom.

Running along the opposite edge of sheet 10 paralleling the bead 11 are a pair of welts or beads 12 and 13. These two beads are also formed during the extrusion of the sheet and are likewise of thickness considerably greater than the sheet itself. Welts 12 and 13 are separated by and joined together by a narrow strip of polyethylene 14 of thickness substantially less than that of the welts. This strip 14 is preferably of about the same thickness as the major portion of sheet 10.

The sheet 10 is shown in Fig. 1 as it appears after being extruded and transversely cut to the desired length. In Fig. 2 the relative thicknesses of welts 11, 12 and 13 and sheet 10 are shown in an edge view. As may be seen, strip 14 is equal in thickness to sheet 10. When sheet 10 with parallel welts 11, 12 and 13 is received by the ultimate customer, he is instructed to separate welt 13 from welt 12 by cutting or tearing along strip 14. The beginning of such a tearing operation is shown in Fig. 3 wherein the first few inches of welt 13 have been separated from welt 12 along strip 14.

In Fig. 4, sheet 10 is shown after having been cut to a length approximately six inches greater than the window height and after the ends of the sheet perpendicular to welts 11 and 12 have been wrapped one or two times around lengths of the severed welt 13. Prior to wrapping the non-beaded edges of sheet 10 around lengths of severed welt 13, welt 13 is cut into two lengths approximately equal to the width of the window to be covered by the plastic sheet.

While Fig. 4 and Fig. 6 depict the use of sheet 10 in its original width, it should be understood that the width of sheet 10 (as well as the length) may be shortened by simply wrapping as many turns of the sheet therearound as may be necessary.

In Fig. 5 is shown an edge view of sheet 10 after it has been wrapped once around a length of welt 13.

Fig. 6 shows the polyethylene window covering after it has been substantially completely nailed in place on a window frame. While it is shown as having been fastened to the outside of the casement, it may also be affixed to the inside or, for example, tacked to a screen. The nails or staples are driven through the welts 11 and 12 and through the wrapped lengths of severed welt 13 at both ends of the window.

While the present description has been directed to window coverings, it will, of course, be recognized that such an article may be used for various closure and covering purposes. Thus, they have utility wherever it is desired to affix in a semipermanent manner a substantially impermeable covering. They may, for example, be used as coverings for boxes of vegetables or fruits which would be crushed by a less resilient covering. And they have application as protective floor coverings, porch enclosures and in many other uses.

While the width of the bead or welt is not critical, it is, so far as application to windows and doors is concerned, usually undesirable that it be much wider than about three-quarters of an inch although it may if desired. Since the purpose of the bead is to afford a relatively strong portion through which to drive the fastening means, it is generally desirable to have it at least about three-eighths of an inch in width although it may be somewhat narrower.

The present invention has been described with particular reference to a sheet embodying a single bead along one edge and a double bead along the other. Naturally, if desired, such double beads could be embodied along each side of the sheet without in any way departing from the spirit of this invention.

I claim as my invention:

1. A covering for a rectangular opening comprising a sheet of thermoplastic embodying a bead of such thermoplastic along one edge, said bead being a continuation of said sheet and having substantially greater thickness than said sheet and embodying on the opposite edge of said sheet, parallel to said bead, a pair of parallel, coextensive beads of said thermoplastic, said pair of beads each being substantially the same in width and thickness as said bead on the opposite side of said sheet and being separated from each other by a strip of thermoplastic of substantially lesser gauge than that of said beads and the outer bead of said pair of beads being detachable from that contiguous thereto for use in conjunction with the unbeaded edges of said sheet.

2. A covering for a rectangular opening comprising a sheet of narrow gauge polyethylene embodying along one edge a polyethylene bead of at least about ⅜" in width and of substantially greater gauge than the majority of said sheet, said bead being a continuation of said sheet and embodying along the opposite edge of said sheet and parallel to said bead, a pair of parallel, coextensive beads of polyethylene, said pair of beads each being substantially the same in their dimensions as the bead on the opposite side of said sheet and being separated from each other by a strip of polyethylene of substantially lesser gauge than that of said beads and the outer bead of said pair of beads being detachable from that contiguous thereto for use in conjunction with the unbeaded edges of said sheet.

3. The method of covering a rectangular opening with the sheet of thermoplastic embodying a bead of such thermoplastic along one edge, said bead being a continuation of said sheet and having substantially greater thickness than said sheet and embodying on the opposite edge of said sheet, parallel to said bead, a pair of parallel, coextensive beads of said thermoplastic which comprises severing the outer bead of the pair of parallel, coextensive beads, cutting the severed bead into two lengths approximately the width of the opening to be covered, wrapping a portion of each of the non-beaded ends of said sheet around a length of said severed bead and affixing the sheet to edges of the opening to be covered by driving fastening means through the beads along the four sides of said sheet.

4. A covering for a rectangular opening comprising a sheet of thermoplastic embodying a bead of such thermoplastic along one edge, said bead being a continuation of said sheet and having substantially greater thickness than said sheet and embodying on the opposite edge of said sheet, parallel to said bead, a pair of parallel, coextensive beads of said thermoplastic, said pair of beads being separated from each other by a strip of thermoplastic of substantially lesser gauge than that of said beads and the outer bead of said pair of beads being detachable from that contiguous thereto for use in conjunction with the unbeaded edges of said sheet.

References Cited in the file of this patent
UNITED STATES PATENTS
2,736,066    Chren _____ Feb. 28, 1956